United States Patent [19]

Leifsen

[11] Patent Number: 5,275,515
[45] Date of Patent: Jan. 4, 1994

[54] POWER CLAMP PIN

[75] Inventor: J. Arthur Leifsen, Bethpage, N.Y.

[73] Assignee: Grumman Aerospace Corporation, Bethpage, N.Y.

[21] Appl. No.: 901,978

[22] Filed: Jun. 22, 1992

[51] Int. Cl.⁵ .......................... B23B 45/14; B23Q 3/14
[52] U.S. Cl. ........................ 408/72 R; 408/72 B; 408/79; 408/103; 408/115 R; 408/241 B
[58] Field of Search .......................... 408/3, 72

[56] References Cited

U.S. PATENT DOCUMENTS

| | | | |
|---|---|---|---|
| 652,251 | 6/1900 | Cunningham | 408/79 |
| 2,636,404 | 4/1953 | Davis | 408/94 |
| 3,230,834 | 1/1966 | Bohannon | 408/79 X |
| 3,663,115 | 5/1972 | Vindez et al. | 408/79 |
| 4,137,003 | 1/1979 | Budoff | 408/103 |
| 4,153,384 | 5/1979 | Isaken | 408/103 X |

*Primary Examiner*—Timothy V. Eley
*Attorney, Agent, or Firm*—Pollock, Vande Sande & Priddy

[57] ABSTRACT

An index-locator pin passes through an aligned hole formed through a drill plate and juxtaposed pack-up and is displaced by a power fastener tool. A gauge pin is transversely positioned within the index-locator pin and pushes the pack-up against a drill plate in response to displacement of the index-locator pin. By maintaining the drill plate in clamping relationship against a multi-layer pack-up, a hole pattern in the drill plate may be replicated in the pack-up with high precision.

2 Claims, 1 Drawing Sheet

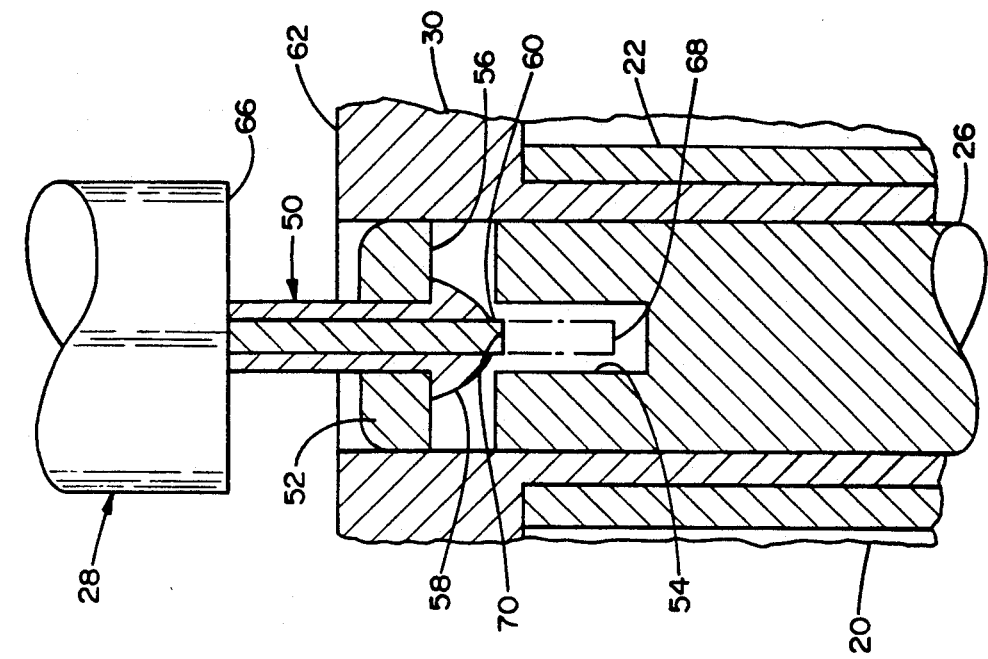
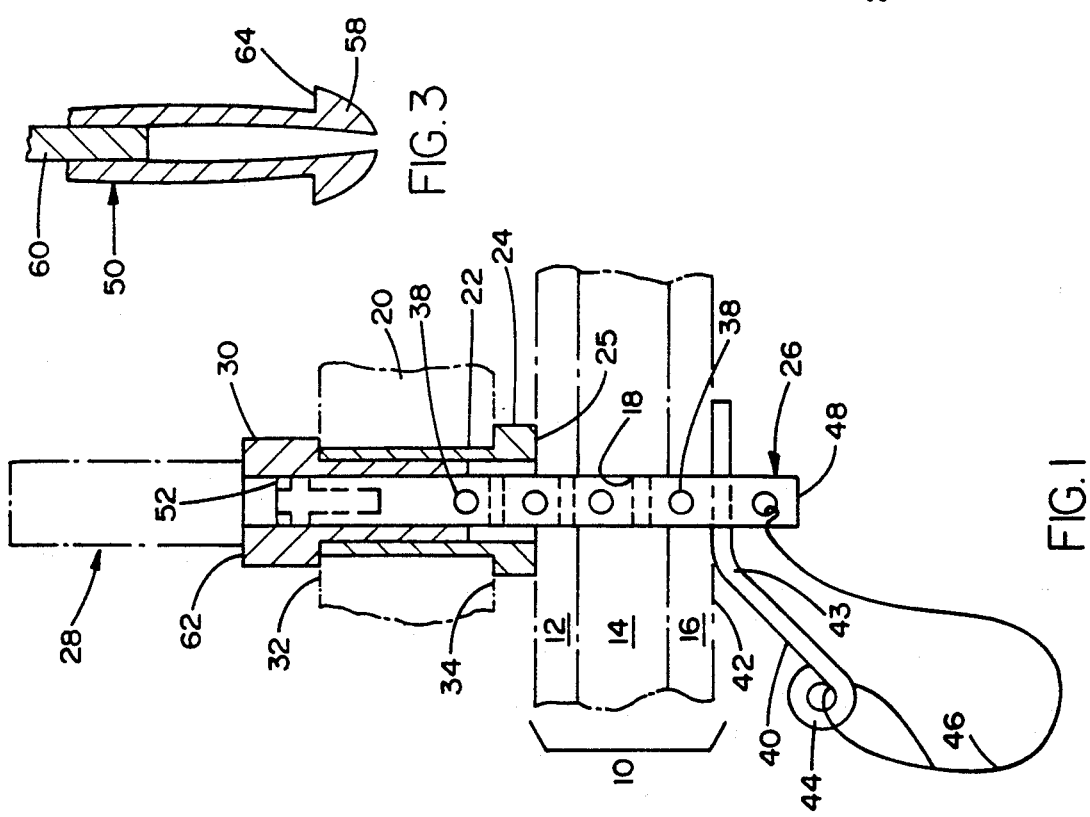

POWER CLAMP PIN

FIELD OF THE INVENTION

The present invention relates to clamping and locating devices, and more particularly to a powered clamping device for maintaining a drill plate against a multi-layer structure.

BACKGROUND OF THE INVENTION

In the fabrication of aircraft structures, drill plates are often clamped against a multi-layer structure in preparation of a multi-hole drilling procedure. In essence, the drill plate acts as a template with hole patterns to be replicated in the multi-layer aircraft structure. In the past, different types of clamping devices have been employed but a major problem arises after several holes have been drilled. Specifically, conventional clamping devices allow incremental movement of the drill plate relative to the work piece, thereby detracting from the required accuracy for drilling.

Attempts have been made in the past to use the first couple of holes drilled as pilot holes and to install bolts or threaded pins in those pilot holes and through the drill plate and structure in an attempt to maintain alignment between the drill plate and structure. However, often the holes are cold worked before the insertion of bolts and the bolt threads can cause damage to the holes which could ultimately result in rupture of the structure.

An additional problem presented by prior art clamping techniques resides in the insufficient clearance and attendant difficulties of working in tight spaces. If threaded bolts are used, working in tight places becomes difficult due to the extension of the bolt or the existence of a fastening nut.

BRIEF DESCRIPTION OF THE PRESENT INVENTION

The present invention eliminates the need for special clamping devices and is generally universal in its application. The present invention ensures positive clamping without damaging cold-worked holes and it may be used in tight areas. The clamping means can be used without drill plates to maintain pack-up with precision holes (such as cold-worked holes). They also allow for a wide range of grip lengths (thickness of pack-up).

BRIEF DESCRIPTION OF THE FIGURES

The above-mentioned objects and advantages of the present invention will be more clearly understood when considered in conjunction with the accompanying drawings, in which:

FIG. 1 is an elevational view partially in section of the present invention in an installed condition;

FIG. 2 is a partial sectional view of the present invention as employed with a power fastening device for effecting clamping of a drill plate against a work piece; and FIG. 3 is a partial sectional view of a power fastener used in the present invention.

DETAILED DESCRIPTION OF THE INVENTION

Referring to the figures, and more particularly FIG. 1, reference numeral 10 indicates a workpiece that can be a multi-layer "pack-up" such as exists for aircraft structures which can be variable, tapered, or curved. The figure illustrates three layers of material 12, 14, and 16 through which a production hole 18 has been drilled prior to utilization of the inventive clamping pin. A drill plate 20 is positioned over the pack-up 10 and is separated from the pack-up by a cylindrical drill bushing 22 which is a part of the drill plate and which has an annular head portion 24 acting as a spacer between the underside 34 of the drill plate and the pack-up 10. It will be appreciated that the tool of the invention can be used without the drill plate 20 or the cylindrical drill bushing 22.

The inventive power clamp pin assembly includes an index locator pin generally indicated by 26, employed to clamp and positively locate the drill plate 20 with its cylindrical drill bushing 22 and slip bushing 30 to the pack-up 10 such that relative movement between the drill plate and pack-up is prevented.

The present invention is secured by a power fastener 28 which is known as the WEDGELOCK or CLECO power fastener tool and is driven by a pneumatic hand tool such as those widely used in the industry (not shown). The power fastener 28 operates in conjunction with the slip bushing 30 as illustrated, the latter-mentioned bushing being used with and positioned against the upper surface 32 of the drill plate 20. The bushing 30 rests coaxial with production hole 18 formed in the pack-up 10 as well as cylindrical drill bushing 22 of the drill plate 20.

The heart of the present invention is an index-locator pin 26 which is positioned in use in the production hole 18 and lies coaxial within the slip bushing 30 and cylindrical drill bushing 22 as shown in FIG. 1.

A number of transverse holes such as 38 are formed through the index-locator pin 26 thereby enabling a gauge pin 40 to be inserted through one of the holes 38, the gauge pin contacting the lower surface 42 of the pack-up 10. The purpose of tool 28 is to impart an upward motion to index-locator pin 26 which therefore forces the pack-up 10 against the head 25 of bushing 22 thereby clamping them together with drill plate 20, bushing 30, and power fastener 28 at surface 62 which prevents relative motion between the drill plate and pack-up during subsequent drilling of multiple holes in the pack-up in accordance with a hole pattern in the drill plate 20. It is desirable to install at least two index-locator pins 26 to minimize the likelihood of relative displacement between the drill plate 20 and pack-up 10.

The gauge pin 40 has a bend along a medial portion 43 to minimize surface contact so that the pin can accommodate contoured pack-up surfaces and to facilitate its insertion thereby increasing the versatility of the invention. An outer loop 44 is formed in the pin so that it may be grasped and a lanyard 46 may be attached thereto and appropriately attached such as through the lowermost of holes 38 in the lower end 48 of index-locator pin 26 thereby acting as a securement device for the gauge pin 40. The lanyard prevents the index-locator pin from being inserted in use from its wrong end 48.

Reference numeral 50 generally indicates the expandable tangs of power fastener 28, this fastener being an expandable fastener, as more clearly shown in FIGS. 2 and 3. The upper end 52 of the index-locator pin 26 includes an axial blind bore 54 intercepting a transverse through-bore 56. The power fastener tangs 50 itself includes tines 58 which are cammed outwardly by the axial camming blade 60 of power fastener 28 driven by a pneumatic hand tool (not shown) (FIG. 3). The expansion of the fastener is conventional.

In operation of the invention, reference is made to FIGS. 1 and 2. The index-locator pin 26 is inserted into production hole 18 from the lower surface 42 of pack-up 10 such that the upper end 52 of the index-locator pin 26 is located at or below the upper surface 62 of slip bushing 30. With the index-locator pin 26 so installed, the expandable tines 58 of the power fastener 28 are inserted into the axial blind bore 54 of the index-locator pin 26. Pneumatic hand tool 28 is then actuated to draw the expandable tines 58 upward into the body of power fastener 28 such that the axial camming blade 60 forces the tines outwardly to bring the projections 64 thereof (FIG. 3) into engagement with upper side of transverse through-bore 56 of index-locator pin 26. Once the expandable tines 58 are fully engaged as depicted in FIG. 2 (70), gauge pin 40 is inserted into a hole 38 in index-locator pin 26 closest to the bottom surface 42 of the pack-up 10. Tool 28 is then actuated to draw index-locator pin 26 upwardly such that gauge pin 40 acts to clamp the pack-up 10 securely against the bushing head 24, drill plate 20, and bushing 30. The axial blind bore 54 will accept the camming blade 60 as the pin 26 moves upward and the pack-up 10 is thus clamped securely such that subsequent operations such as drilling, riveting, and the like can be performed thereupon. Note the position 68 of the fully engaged camming blade 60 within the axial bore 54.

It should be understood that the invention is not limited to the exact details of construction shown and described herein for obvious modifications will occur to persons skilled in the art.

I claim:

1. A pin assembly driven by a power fastener tool for clamping a drill plate having a hole pattern therein to an aircraft structure pack-up, the pin assembly comprising:
   an index-locator pin disposed in a hole formed through the drill plate and the pack-up;
   an end of the pin having a recess formed therein for receiving a power fastener;
   a cylindrical spacer inserted into the drill plate and contacting a confronting first surface of the pack-up, for bearing against the pack-up; and
   a gauge pin inserted transversely through the index-locator pin for abutting a second opposite surface of the pack-up and limiting displacement of the pack-up relative to the index-locator pin and drill plate;
   wherein tool actuation expands the fastener to engage the recess in the index-locator pin and pulls the index-locator pin thereby clamping the drill plate to the pack-up via the spacer;
   the recess in the index-locator pin including an axial blind bore for receiving a displaceable blade of the power fastener; and
   a through bore transversely intersecting the blind bore for receiving a head of the fastener;
   wherein the gauge pin has a first straight portion for abutting the pack-up surface, and a second straight portion angularly offset from the first straight portion for allowing the gauge pin to be grasped during its full insertion and withdrawal into the index-locator pin.

2. The pin assembly set forth in claim 1 together with a tether wire connected between a looped end of the second straight portion of the gauge pin and an end of the index-locator pin.

* * * * *